R. MILLER, Jr.
TRAILER TRUCK.
APPLICATION FILED APR. 16, 1918.
1,287,727.
Patented Dec. 17, 1918.
4 SHEETS—SHEET 1.
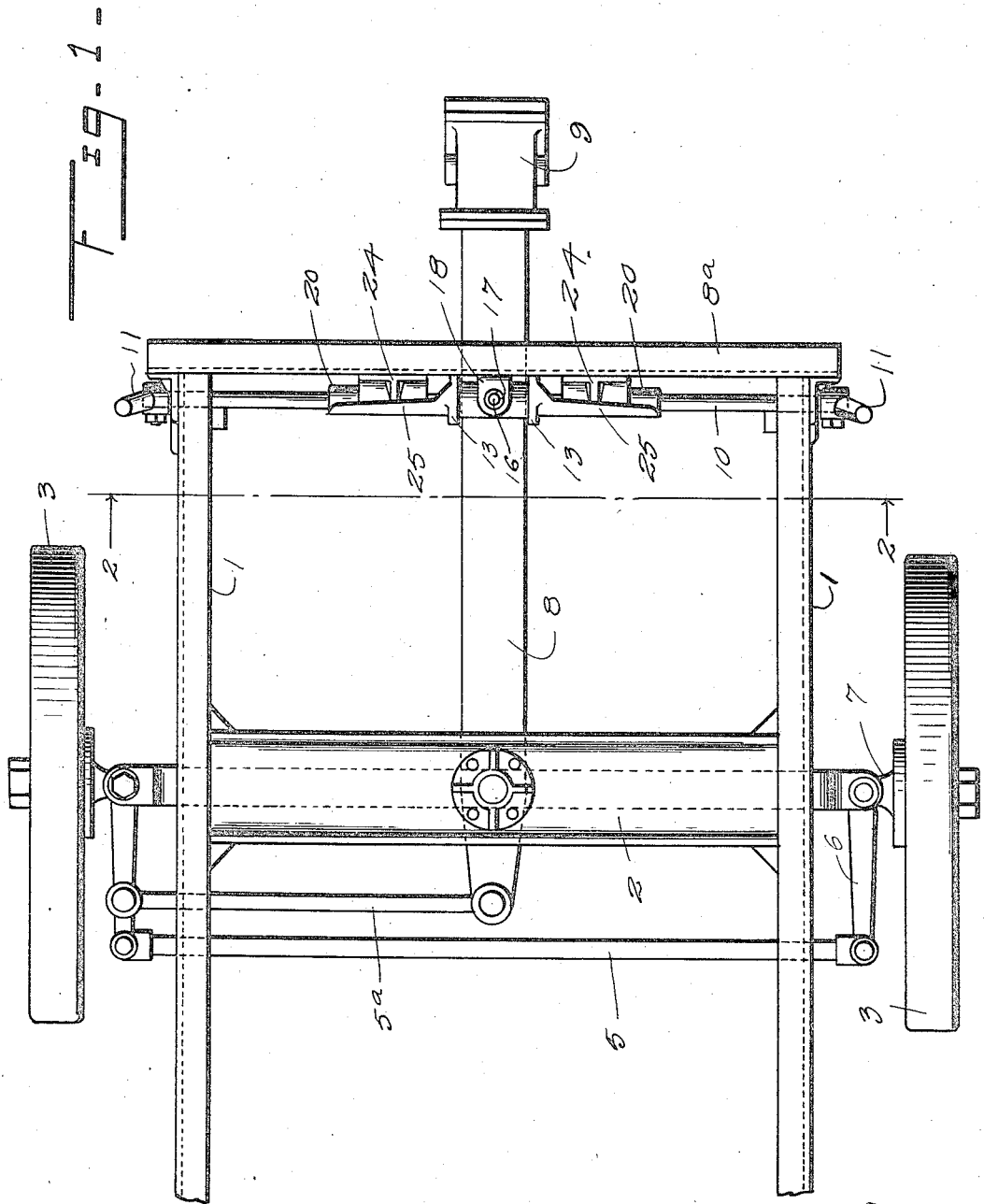
Inventor
Reuben Miller, Jr.

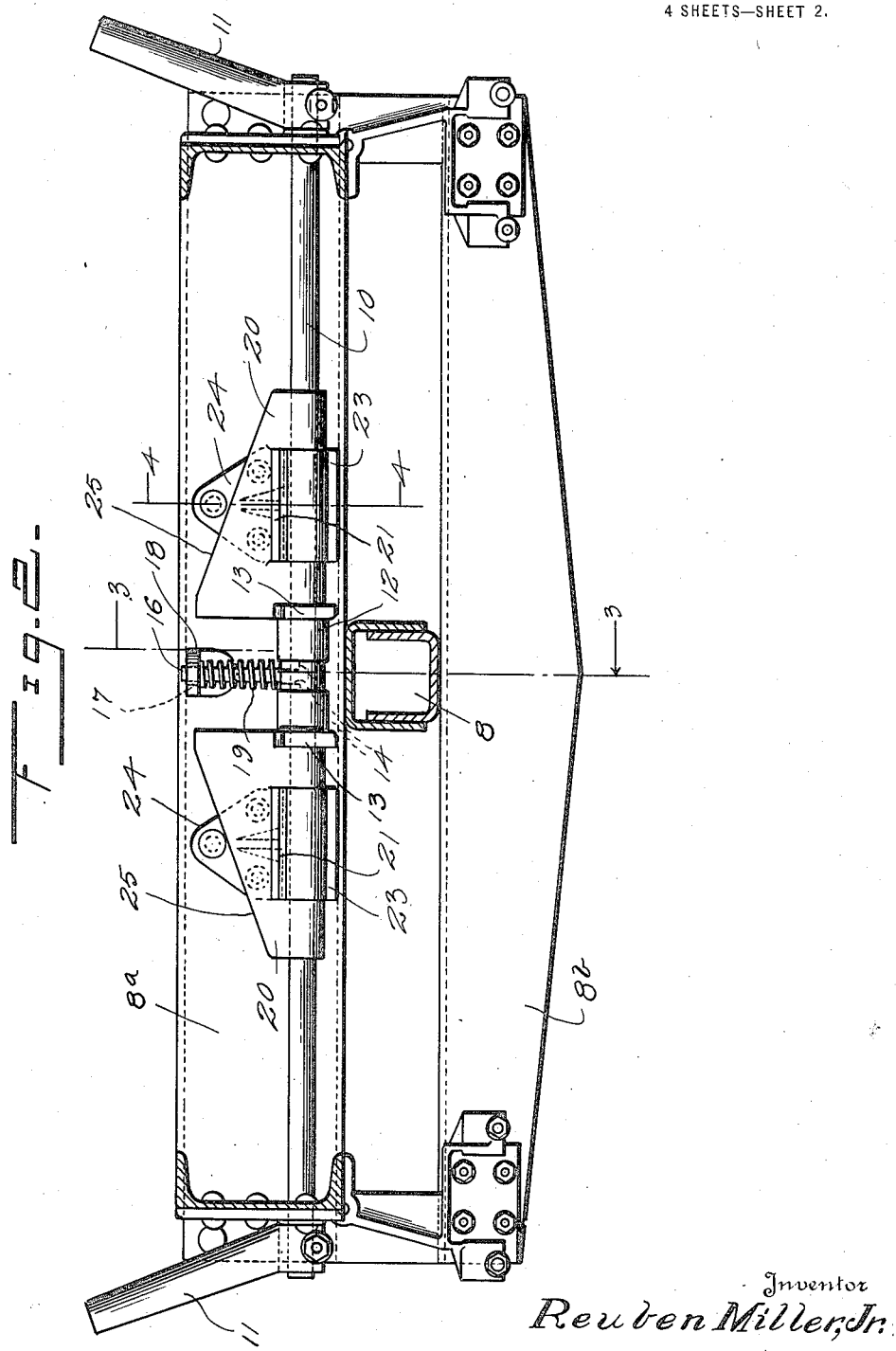

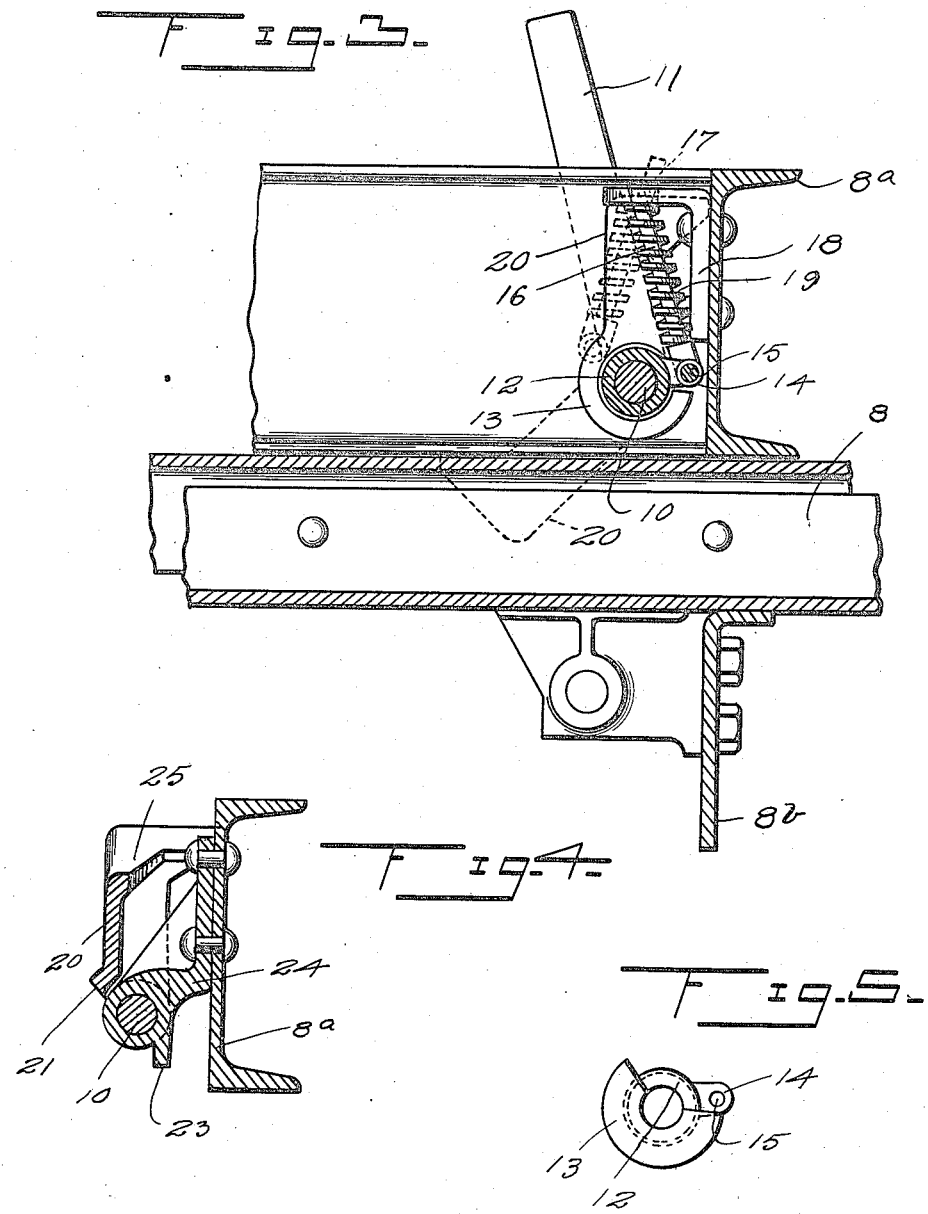

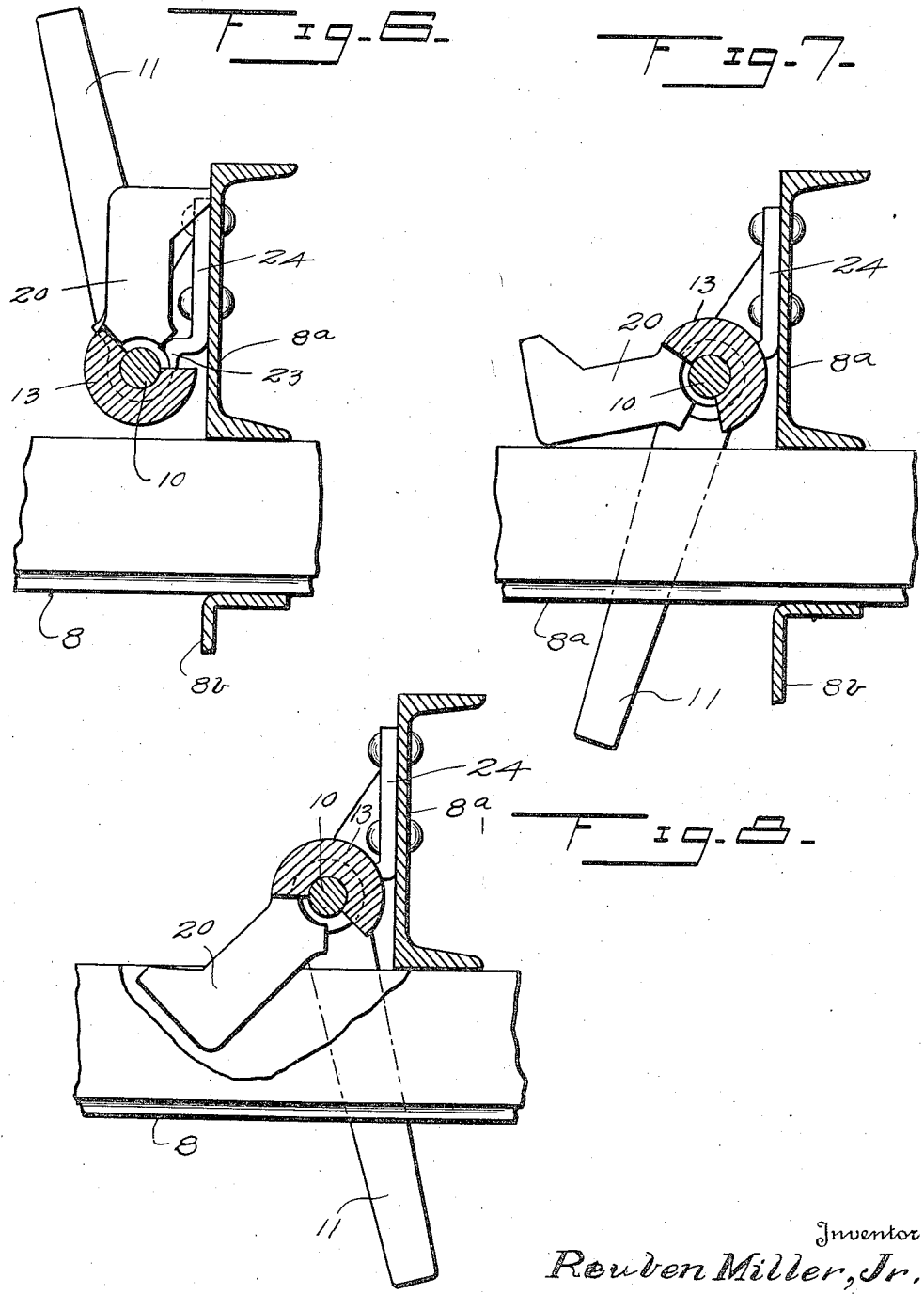

UNITED STATES PATENT OFFICE.

REUBEN MILLER, JR., OF PITTSBURGH, PENNSYLVANIA.

TRAILER-TRUCK.

1,287,727.  Specification of Letters Patent.  Patented Dec. 17, 1918.

Application filed April 16, 1918. Serial No. 228,962.

*To all whom it may concern:*

Be it known that I, REUBEN MILLER, Jr., a citizen of the United States, residing at Pittsburgh, in the county of Allegheny and State of Pennsylvania, have invented certain new and useful Improvements in Trailer-Trucks, of which the following is a specification.

This invention relates to an improvement in a vehicle usually referred to as a trailer-truck the ends of which are constructed as duplicates. At each end of the truck is a draw-bar which may be locked in central position of the truck when it is desired to draw or push the truck in either direction. This draw-bar may swing to either side of a central position. It is usual in this type of truck to which my invention is applied to have the draw-bar connected in a well-known manner with the member by which the wheels are guided.

The particular object of my invention is the construction of a locking device to hold the draw-bar in central position and to allow automatic motion of it to central position from either side.

Another object to be accomplished by my invention is the construction of a locking means for the draw-bar which will be sure to act when the parts have reached operative position and which will not fail to act because of the rapidity of the movement of the parts, faulty construction or other reasons.

In the accompanying drawings, Figure 1 shows a plan view of one end and a trailer-truck with the draw-bar in central position. Fig. 2 is a section on line 2—2 of Fig. 1. Fig. 3 is a section on line 3—3 of Fig. 2. Fig. 4 is a section on a line 4—4 of Fig. 2. Fig. 5 is an end view of the spool. Fig. 6 is an end view partly in section showing the locking members in unlocked position. Fig. 7 is a similar view showing the locking parts in automatic position. Fig. 8 is also a similar view showing the locking parts in locked position.

Similar reference characters are given to the parts throughout the several views.

Referring to the parts illustrated, the usual truck side frames 1 are secured to the axle 2 by springs (not shown) in any suitable manner. The wheels 3 are swivelly connected to the axle as is customary in constructing trucks of this character, no detail showing of the manner of construction being necessary. A member 5 is connected by arms 6 to steering knuckles 7 in a manner that is well known.

The draw-bar 8 is pivotally connected to the axle 2 and also to a steering member $5^a$ pivotally connected to the arm 6. The head of the draw-bar extends through end frames $8^a$ and $8^b$ of the truck and has on the outer end the usual coupler head 9.

The device employed by me for locking the draw-bar in central position comprises among other parts, a shaft 10 on each end of which are levers 11 for manual manipulation thereof. The ends of this shaft are journaled in the side frame 1. Centrally arranged on this shaft 10 and secured thereto is a spool 12 having at each end thereof annular flanges 13 extending about two-thirds the distance around the periphery of the spool as shown in Fig. 5. Pivotally attached by one end to the middle of spool 12 by means of two lugs 14 and a pin 15 is a spring guide post 16, the other end of which slides through a hole 17 in a bracket 18 attached to end piece $8^a$. Surrounding the post 16 is a compression spring 19 one end of which abuts against the bracket 18 and the other against the enlarged end of the post 16. The function of this spring will be explained later. Loosely attached to the shaft 10 are two triangular shaped locking members 20 the inner ends of which extend into the open parts of the flanges 13 on the spool 12. The ends of these locking members do not completely fill the broken away parts of the annular flanges but are of a size to allow considerable play. At the lower part of these triangular locking members are extensions 21 which stop the downward movement of the locking members by abutting against extensions 23 on brackets 24 which are affixed to the end pieces $8^a$ and $8^b$ and which act as journals for the shaft 10 as shown in Fig. 4.

When the locking device is in the position shown in Fig. 2, the draw-bar will swing freely in the space between the end frames $8^a$ and $8^b$. The locking device is held in the position shown in Fig. 2 and prevented from accidentally passing to locked position by the compression spring 19.

The locking device is brought to locked position by means of either of the handles 11. When the device is locked the various parts are in the position shown in dotted lines in Fig. 3 and in full lines in Fig. 8 and are held securely in locked position by the compression spring 19. When in locked position the draw-bar is held centrally by means of the two tri-angular locking members 20 which act together.

If, however, the draw-bar is swung either to the left or to the right when the locking device is placed in operative position, it may be swung to central position where it is automatically locked. The draw-bar may swing to central position by pushing up either of the triangular members due to their construction with sloping sides as shown at 25 and the broken away part of the spool as shown in Fig. 5 which allows the hinged part 20 to rise far enough to permit the draw-bar to swing to central and locked position. When the draw-bar is in central position it can not move laterally without the locking members being placed in the position shown in Fig. 2.

It is apparent from the above description that the draw-bar may move to locked position after the locking members have been placed in locking position. Further, that such movement is permitted by the repression of either locking member by the draw-bar as the latter moves over that member and that such repression of one locking member does not repress the other locking member but leaves it in full locking position. By this arrangement, I permit the draw-bar to move to locking position at any time and yet insure that it shall be positively arrested and held there whenever locking thereof is desired.

Having described my invention, what I claim is:—

1. In a vehicle of the kind described, the combination of a frame, a draw-bar pivotally attached to said frame, means to lock said draw-bar centrally of the frame, comprising a shaft, locking members loosely mounted on said shaft, a spring operatively connected to said shaft to hold the locking device in either locked position or unlocked position and means to operate the locking device.

2. In a vehicle of the kind described, the combination of a frame, a draw-bar pivotally attached to said frame, means to lock said draw-bar centrally of the frame, comprising a shaft, locking members loosely mounted on said shaft, a bracket attached to said frame, a guide post connected to said shaft, a spring on said post to hold the locking device in either locked position or unlocked position and means to operate the locking device.

3. In a vehicle of the kind described, a frame, a shaft journaled in said frame, two locking members loosely mounted on said shaft and each provided with a projection, a member secured to said shaft between said locking members and provided at each end with a rim, each rim being recessed to receive one of said projections, said recesses being of appreciably greater angle than that subtended by said projections, stops to limit the motion of said locking members, a draw-bar pivoted on said frame and adapted to be engaged by said locking members and thus held in locked position, and a cam surface on each locking member whereby the draw-bar may move to locked position after the locking members are in locking position.

4. In a vehicle of the character described, a frame, a draw-bar connected thereto and capable of lateral movement, a locking member against which the draw-bar abuts to arrest such movement in one direction, a similar locking member to arrest such movement in the opposite direction, means associated with each of said members to permit movement of the draw-bar from unlocked positions to the locked position, and means for simultaneously releasing said locking members to permit the movement of the draw-bar in either direction.

5. In a vehicle of the character described, a frame, a draw-bar connected thereto and capable of lateral movement, a pivoted locking member against which the draw-bar abuts to arrest movement in one direction, a similar locking member to arrest such movement in the opposite direction, a beveled surface on the rear of each locking member to permit movement of the draw-bar from the unlocked positions to the locked position, and means for simultaneously releasing said locking members to permit the movement of said draw-bar in either direction.

6. The device as in claim 4, said releasing means being constructed to permit movement of either locking member from locking position, without moving the other locking member from locking position.

7. The device as in claim 4, said releasing means comprising a shaft and a lost motion connection from said shaft to each of said locking members.

In testimony whereof I affix my signature.

REUBEN MILLER, Jr.